United States Patent [19]
Pohl

[11] 3,777,280
[45] Dec. 4, 1973

[54] LASER GENERATOR OF TE WAVE GUIDE MODES

[75] Inventor: Dieter Pohl, Adliswil, Switzerland

[73] Assignee: International Business Machines Corporation, Armonk, N.Y.

[22] Filed: June 21, 1972

[21] Appl. No.: 265,014

[30] Foreign Application Priority Data
Aug. 12, 1971  Sweden .................... 11891/71

[52] U.S. Cl. ............................... 331/94.5
[51] Int. Cl. ............................... H01s 3/10
[58] Field of Search .................... 331/94.5

[56] References Cited
UNITED STATES PATENTS
3,435,371  3/1969  White ........................... 331/94.5
3,628,173  12/1971  Danielmeyer ................ 331/94.5

*Primary Examiner*—William L. Sikes
*Attorney*—George Baron et al.

[57] ABSTRACT

Propagating radiation with rotationally symmetric optical modes of the $TE_{01}$ (and $TM_{01}$) type show promising properties for future applications. For their generation, laser cavities inherently enhance the rotationally symmetric $TEM^*_{01}$ (and $TEM^*_{10}$) laser modes. These cavities must suppress the otherwise usual fundamental $TEM_{00}$ mode, and in addition discriminate against unwanted same order modes like the linearly polarized $TEM_{01}$ and $TEM_{10}$ laser modes.

A birefringent crystal zero degree calcite inserted into the cavity applies higher losses at the aperture to the extraordinary beam showing the $TEM^*_{10}$ mode. Thus, the ordinary beam showing the wanted $TEM^*_{01}$ laser mode is favored. Mode selection is further assisted by a Galilean telescope-like setup of the crystal. Discrimination against fundamental mode and higher order modes may be improved by the insertion of circular or ring shaped apertures in the telescope arrangement.

19 Claims, 4 Drawing Figures

PATENTED DEC 4 1973    3,777,280

LASER GENERATOR OF TE WAVE GUIDE MODES

BACKGROUND OF THE INVENTION

The invention relates to a laser for the generation of light in rotational symmetric modes, especially the $TE_{01}$ propagation mode.

Common laser oscillators for the generation of stimulated monochromatic and coherent radiation emit linearly polarized light. The laser resonator is normally excited in the simplest mode with the lowest losses, the so-called ground mode. In comparison with the wavelength of the radiation, the dimensions of optical cavities are large. Since for each standing wave the length of the cavity must equal an even multiple of the half wave length many resonator modes are possible. In the resonator every existent standing wave represents a so-called mode which can be distinguished by its polarization, direction and frequency.

For controlling the frequency of the radiation, longitudinal mode selectors are known which maintain constant the number of half waves over the length of the cavity. However, besides each longitudinal mode there exists a considerable number of so-called transverse modes having all approximately or exactly the same frequency but different field distribution in the transverse direction. They can be defined after the number of their node lines which lines may be seen for instance in the radiation pattern of the laser or on the reflectors terminating the laser cavity. Linearly polarized modes show orthogonal node planes. These modes are designated as TEM laser modes with double indices whereby these indices define the number of node planes. Hence $TEM_{oo}$ designates the ground mode having no node planes. Higher transverse modes show node areas according to the indices, like $TEM_{21}$. For the sake of clarity, rotational symmetric laser modes are in addition designated with an asterisk in the following way. In this way, the $TEM^*_{01}$ laser mode designates a mode having a central node cylinder.

Rotational symmetric laser modes are of growing importance since they lead to the generation of optical radiation in the $TE_{01}$ or $TM_{01}$ propagation mode, respectively. These are the two lowest order rotational symmetric propagation modes as we know from microwave technology. Out of these two, the azimuthally polarized radiation of the $TE_{01}$ mode looks especially promising in view of unique properties. When the technology of information transmission is expanded from micro-waves to the region of optical frequencies this wave type, namely, $TE_{01}$, can be transmitted without loss and with no sensitivity against bends of the metallic wave guide. $TE_{01}$ and $TM_{01}$ are the lowest order propagation modes for which dielectric wave guides have a defined and finite cut-off frequency. Feeder connections to rotating antenna systems can easily be built due to the rotational symmetry of the wave types involved. In addition, interesting non-linear optical effects are to be expected as can be estimated from calculations. Among the low order propagation modes only the $TE_{01}$ wave exhibits the property of "self-trapping," that means, it can build its own wave guide as a filament in certain media.

The discrimination between degenerate same order modes is especially difficult for lasers which should operate in pure rotational symmetric modes and which should discriminate against the ground mode. Such degenerate modes are known for having the same frequency and the same energy distribution over the beam cross-section. For this reason they cannot be separated, e.g., by apertures, without applying further means.

In accordance with the teaching of U.S. Pat. No. 3,283,262, a laser has become known for the generation of $TM_{01}$ mode radiation whose transverse mode selector comprises at least one conical dielectric interface. The apex of the cone is located in the optical axis and the cone's angle of the glass cone is equal to the complementary Brewster's angle. Hence the radially polarized $TM_{01}$ wave is favored among the rotational symmetric propagation modes of the radiation. However, the manufacture of this known device demands the preparation of optically accurate conical surfaces. This kind of production method is, however, especially difficult. Only plane or spherical surfaces can be manufactured in optically useable quality at reasonable cost.

OBJECTS OF THE INVENTION

It is therefore the object of the invention to design a laser for the generation of light in rotational symmetric modes, especially in the $TE_{01}$ propagation mode, comprising a suitable mode selector which can be easily manufactured. According to the invention, the laser is characterized in that, within the optical cavity, transverse mode selection means are provided which comprise at least one birefringent uniaxial crystal for the discrimination between degenerate higher order modes whereby the crystal optical axis coincides with the optical axis of the cavity.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENT

Figure 1:
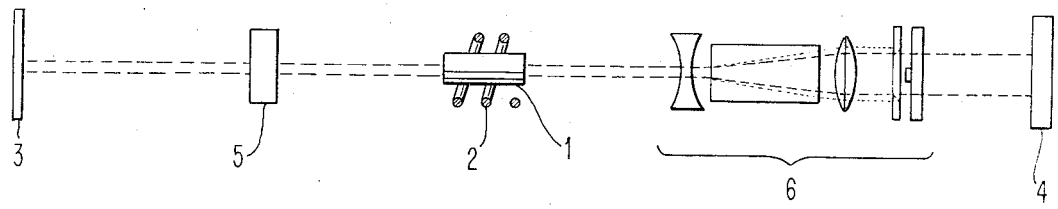
FIG. 1 shows schematically the general set-up of a laser for the generation of light in rotational symmetric modes.

As an example, there is shown in FIG. 1 a solid state laser with a passive Q-switch for the generation of giant pulses. The active medium of the laser is a ruby crystal 1, adjacent to it there is arranged the pump light source 2. The optical cavity is terminated by reflectors 3, 4. One of the reflectors 3 is suitably designed as a resonant reflector for longitudinal mode selection. The other reflector 4 serves also as an output mirror. In the radiation path there is provided a Q-switch 5, e.g., a cell containing a bleachable dye-like cryptocyanine dissolved in methanol, This passive Q-switch 5 is shown in the drawing between the solid state active medium 1 of the laser and the terminating reflector 3. It can be inserted also at another section of the radiation beam, for example, adjacent to the transverse mode selector 6. Particulars of this transverse mode selector 6 are explained hereinafter in connection with FIG. 4.

Figure 2:
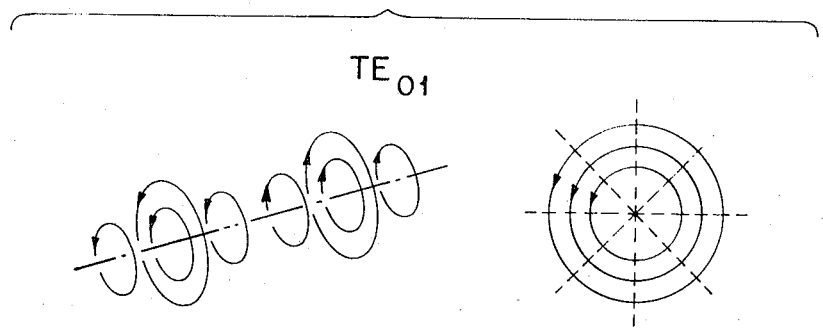
FIG. 2 is used for the explanation of the $TE_{01}$ propagation mode.
Figure 3:
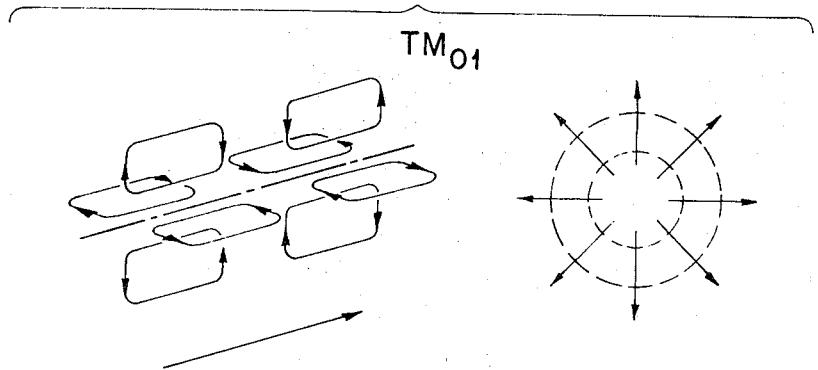
FIG. 3. is used for the explanation of the $TM_{01}$ propagation mode.

FIGS. 2 and 3 show the rotational symmetric field distribution of the most interesting radiation propagation modes $TE_{01}$ and $TM_{01}$. At the bottom of the perspective views an arrow indicates the propagation direction. As can be seen from FIG. 2, the closed transverse electrical field lines of the $TE_{01}$ mode enclose orthogonally the propagation coordinate direction in a ring-shaped manner. One can clearly perceive from the plan view the azimuthal polarization of this mode resulting in a radiation pattern like a bright tube with a dark kernel. The orthogonal dashed magnetic fieldlines run radially in planes perpendicular to the propagation coordinate direction.

In the $TM_{01}$ propagation mode the transverse magnetic field-lines are closed rings perpendicular to the axis. As can be seen from FIG. 3, the electric field-lines form closed loops within planes of a plane bundle whose planes all contain the propagation coordinate direction. The plan view in propagation direction shows the radial polarization of the transverse magnetic $TM_{01}$ mode by the entered arrows. Both types of rotational symmetric propagation are polarized perpendicularly to each other. Hence, they can be converted into each other by a 90° optical active medium. A quartz crystal, rotating the polarization direction and inserted into the radiation path, converts an azimuthal polarization into the radial polarization and vice versa. Thus both rotational symmetric propagation modes of the radiation can be generated provided that only one of both modes exists purely.

Figure 4:
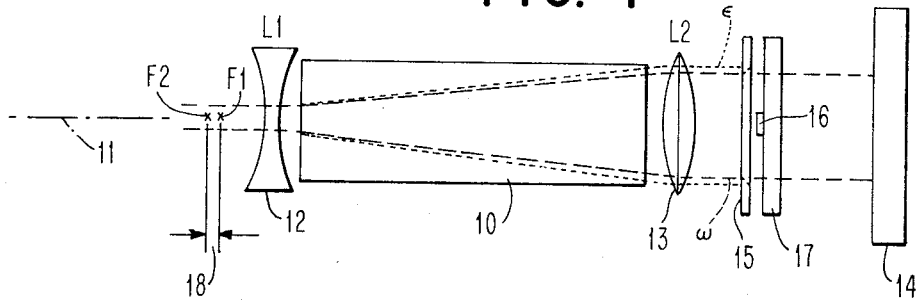
FIG. 4 shows schematically the transverse mode selector to be used in the optical cavity of the laser.

FIG. 4 shows schematically a transverse mode selector whose incorporation into the optical cavity enables the laser to generate light of the $TE_{01}$ mode. This type of mode selector is suitable for every kind of laser be it a solid state laser or a gas laser. A continuous wave gas laser is advantageous for information transmission application. The embodiment described relates to a giant pulse laser with a ruby crystal as the active medium.

The transverse mode selector has to fulfil the following tasks. The ground mode $TEM_{00}$ without any node plane which can be excited in the easiest way should be suppressed. Also higher order laser modes having more than one node area should not be excited. The most difficult task, however, is the discrimination of the desirable rotational symmetric $TEM^*_{01}$ laser mode with one node cylinder leading to the generation of the $TE_{01}$ propagation mode optical radiation against other excitable same order modes. To this group of modes belongs the other rotational symmetric $TEM^*_{10}$ laser mode with the same intensity distribution which leads to the generation of $TM_{01}$ propagation mode optical radiation, or the linearly polarized $TEM_{01}$ and $TEM_{10}$ laser modes having each one node plane or other mixed types or superpositions of same order laser modes. All these modes are degenerate, i.e., they have the same frequency and the same energy distribution across the beam cross-section.

The suppression of higher order modes is easily achieved by a circular aperture of suitable dimension. This aperture inflicts higher losses to the higher order modes. Hence, in the steady state only lower order modes are dominating.

The easiest excitable ground mode can be suppressed by the insertion into the beam path of a small circular stop perpendicular to the axis. This stop increases the losses of the ground mode so that only the group of the lowest higher order modes is favored. This group of modes, however, is of similar transverse extension. Therefore one cannot achieve a separation of the modes by the insertion of a diaphragm into the beam path. Particularly the earlier mentioned rotational symmetric laser modes $TEM^*_{10}$ and $TEM^*_{01}$ are completely degenerate, i.e., their respective intensity distributions across the beam cross-section are identical.

To lift their degeneracy and to make them distinguishable, one lets them cross a uniaxial birefringent crystal rotated symmetrically with respect to its optical axis direction. The orthogonally polarized beams with azimuthal and radial polarization are each diverted in a different manner due to the crystal's birefringency. To use this effect best, additional optical means should be provided to make the laser beam as divergent as possible within the birefringent crystal. By way of example, a suitable arrangement of the birefringent crystal is used within a telescopic system like a Galilean telescope or like an astronomical telescope. Such a device providing a telescopic ray bundle can be inserted in the plane optical cavity of the Fabry-Perot type at any time. It is, however, possible to build spherical or hemispherical laser resonators in such a way that the birefringent crystal is located in a region having a divergent ray bundle. For this purpose at least one of the terminating reflectors of the optical cavity must be curved.

According to FIG. 4, a birefringent crystal 10 of calcite ($CaCo_3$) is provided in the optical axis 11 of the resonator, which crystal is shaped as a cylinder with plane front faces. The telescopic system consists of a first biconcave lens 12 and a second biconvex lens 13. Between the terminating reflector 14 of the resonator and the second lens 13, i.e., at the side of the larger beam cross-section, a circular diaphragm 15 is provided. It serves for the suppression of higher order transverse modes of the laser light by aperture losses and also for the suppression of the $TM_{01}$ propagation mode made more divergent with the birefringent crystal by favoring the $TE_{01}$ propagation mode. A central circular stop 16 on a transparent carrier 17 in the optical axis serves for screening the ground mode of the laser light.

The laser light being made divergent within the birefringent crystal undergoes a small but distinct double refraction. With regard to the ordinary ray $\omega$, Snell's law of refraction is valid in its known form $$(\sin \alpha/\sin \beta)_o = n_o$$

The angle of incidence is designated $\alpha$, the angle of refraction $\beta$, and $n_o$ means the refractive index of the ordinary ray. With regard to the extraordinary ray $\epsilon$, the law of refraction is valid in a more complicated form. But in view of the small angle of incidence with respect to the optical axis of the crystal 10, the calculation of the refraction of the extraordinary ray can be made with the following approximation $$(\sin \alpha/\sin \beta)_e = n_o (1 - \beta^2/2 \cdot n_o^2 - n_e^2/n_e^2)$$

Round figures of the indices of refraction in calcite are $n_o = 1.7$ for the ordinary ray and $n_e = 1.5$ for the extraordinary ray. Due to the different refraction values, the diameter of the diverging extraordinary ray becomes larger than that of the ordinary ray.

Within the birefringent crystal 10, the E-Vector of the ordinary ray is directed azimuthally and the E-Vector of the extraordinary ray radially. Hence the differently polarized rotational symmetric laser modes spread differently within the crystal. The lowest "ordinary" mode is the desired TEM$^*_{01}$ laser mode for the generation of TE$_{01}$ mode light. The lowest "extraordinary" mode is the TEM$^*_{10}$ laser mode to be suppressed. Due to ray broadening, the latter undergoes higher losses by the circular diaphragm 15 or the aperture stop 16 of the optical system. Thus, it is quite possible to choose the dimensions of the mode selector in such a way that already the aperture stop of that optical system provides the suitable diameter of the higher order mode diaphragm which otherwise must be inserted as circular aperture. Therefore, a separate circular aperture can be omitted by proper design. It has shown that with proper design possibly even the circular screen used to eliminate the ground mode can also be omitted. To guarantee a reliable operation of the mode selector, it is recommended, however, that one combine both mode diaphragms practically in a ring-shaped aperture.

The different indices of refraction for the ordinary ray and for the extraordinary ray effect also a lifting of the frequency degeneracy, i.e., they take effect in the sense of a frequency separation or selection. Because this difference is, however, very small, it is recommended that the laser be operated close to the border of stability of the resonator. This happens in a resonator with plane mirrors when both foci F1 and F2 of the lenses L1 and L2 of the telescopic system coincide. Tests have shown, however, that it is practical to provide a small distance of those foci designated 18 in FIG. 4. This distance 18 was about 0.5 mm in a mode selector whose first lense 12 had the focal distance $f1 = -2$ cm and whose second lens 13 the focal distance $f2 = +6$ cm. The length of the calcite crystal 10 was 4 cm. The diameter of the circular aperture 15 was 5 mm and that of the central circular screen stop 16 was 0.7 mm. The mode selector 6 was inserted in the optical cavity of a giant pulse laser of about 60 cm length. One of the plane mirrors was highly reflecting, the second terminating reflector of the cavity was a resonant reflector for longitudinal mode selection. The active medium 1 of the solid state laser was a 0° ruby crystal of 7.5 cm. A passive Q-switch 5 with crypto-cyanine dissolved in methanol caused giant pulse laser operation. The pulses were of about 50 nsec halfwidth with a peak power of 100 - 300 kW.

The laser crystal, i.e., the active medium 1, can be located on either side of the mode selector 6. At the larger beam diameter side also the mode volume is larger in the active medium resulting in more intense light pulses. Placing the active medium on the lower beam diameter side results possibly in a better radiation pattern if the ruby crystal 1 includes inhomogeneities. The Q-switch 5 can be arranged at any place within the cavity.

To make the light divergent within the birefringent crystal 10 also, lenses can be applied with one plane surface adjacent to a plane frontface of the crystal 10. However, the frontfaces of the crystal 10 which are shown in the embodiment as plane faces can also be formed as spherical faces which operate as lenses at the same time. One should avoid disturbing reflections by spherical faces causing possibly an undesired focus within the crystal 10 affecting it by local destruction with the powerful laser radiation.

I claim:

1. A laser having an optical cavity and an active medium for the generation of light in totally rotational symmetric modes having rotationally symmetric polarization as well as intensity polarization, especially the TE$_{01}$ propagation mode, characterized in that within the optical cavity of said laser, having terminating reflectors, there are provided transverse mode selection means including, for the discrimination between degenerate higher order modes, at least one birefringent uniaxial crystal whose optical axis coincides with the optical axis of the cavity.

2. The laser of claim 1 wherein said birefringent crystal consists of calcite ($CaCO_3$).

3. The laser of claim 2 characterized in that said birefringent crystal has the shape of a cylinder with plane front faces.

4. The laser of claim 3 including optical means for causing the laser beam to be divergent within the birefringent crystal.

5. The laser of claim 3 characterized in that the birefringent crystal is arranged in a telescopic lens system between a diverging and a converging lens of the kind of a Galilean telescope, the axis of said telescopic lens system coinciding with the axis of said laser.

6. The laser of claim 5 characterized in that the telescopic lens system has coincident foci.

7. The laser of claim 5 characterized in that both foci of the telescopic lens system are separated by a small distance.

8. The laser of claim 3 characterized in that the birefringent crystal is arranged in a telescopic lens system between converging lenses of the kind of an astronomic telescope, wherein one end of said telescopic lens system has a large laser beam diameter side and the other end of said telescopic system has a small beam diameter side.

9. The laser of claim 8 characterized in that for the transverse higher mode suppression of the laser light by aperture losses, a circular aperture is arranged between the birefringent crystal and one of said terminating reflectors.

10. The laser of claim 8 characterized in that a central circular screen is provided at the optical axis to eliminate the ground mode of propagation of the laser light.

11. The laser of claim 10 characterized in that there is provided a ring-shaped diaphragm for the mode selection.

12. The laser of claim 8 characterized in that the active medium of the laser is arranged in the cavity before the birefringent crystal at the smaller beam diameter side.

13. The laser of claim 8 characterized in that the active medium of the laser is arranged in the cavity after the birefringent crystal at the larger beam diameter side.

14. The laser of claim 1 characterized in that the active medium of the laser is a solid state body.

15. The laser of claim 1 characterized in that the active medium is a ruby crystal.

16. The laser of claim 1 characterized in that the active medium of the laser is a glass doped with ions of a transition metal.

17. The laser of claim 1 characterized in that the active medium of the laser is a gas or a mixture of gases.

18. The laser of claim 1 characterized in that the laser is a continuous wave laser.

19. The laser of claim 1 characterized in that the laser is a Q-switched giant pulse laser.

* * * * *